(12) United States Patent
Sunkara et al.

(10) Patent No.: US 7,157,607 B1
(45) Date of Patent: Jan. 2, 2007

(54) MANUFACTURE OF POLYTRIMETHYLENE ETHER GLYCOL

(75) Inventors: Hari Babu Sunkara, Hockessin (DE); Howard C. Ng, Kingston (CA); Wei Zheng, Kingston (CA)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/204,713

(22) Filed: Aug. 16, 2005

(51) Int. Cl.
C07C 43/11 (2006.01)
C08J 3/26 (2006.01)

(52) U.S. Cl. ............ 568/619; 524/742; 524/755; 524/760; 524/765; 524/766; 524/767; 524/779; 524/788; 524/414; 524/425; 524/433; 524/438; 528/490; 528/503; 568/679; 568/852; 568/853; 568/854

(58) Field of Classification Search ........ 524/742, 524/755, 760, 765, 766, 767, 779, 788; 528/487, 528/489, 490, 503; 568/852, 853, 854, 886, 568/619, 679
See application file for complete search history.

(56) References Cited

U.S. PATENT DOCUMENTS

| | | |
|---|---|---|
| 5,015,789 A | 5/1991 | Arntz et al. |
| 5,276,201 A | 1/1994 | Haas et al. |
| 5,284,979 A | 2/1994 | Haas et al. |
| 5,334,778 A | 8/1994 | Haas et al. |
| 5,364,984 A | 11/1994 | Arntz et al. |
| 5,364,987 A | 11/1994 | Haas et al. |
| 5,633,362 A | 5/1997 | Nagarajan et al. |
| 5,686,276 A | 11/1997 | Laffend et al. |
| 5,821,092 A | 10/1998 | Nagarajan et al. |
| 5,962,745 A | 10/1999 | Brossmer et al. |
| 6,140,543 A | 10/2000 | Brossmer et al. |
| 6,232,511 B1 | 5/2001 | Haas et al. |
| 6,235,948 B1 | 5/2001 | Sunkara et al. |
| 6,277,289 B1 | 8/2001 | Kurian et al. |
| 6,284,930 B1 | 9/2001 | Haas et al. |
| 6,297,408 B1 | 10/2001 | Haas et al. |
| 6,331,264 B1 | 12/2001 | Kurian et al. |
| 6,342,646 B1 | 1/2002 | Haas et al. |
| 6,608,168 B1 | 8/2003 | Ng |
| 6,720,459 B1 | 4/2004 | Sunkara et al. |
| 2002/0007043 A1 | 1/2002 | Sunkara et al. |
| 2004/0030095 A1 | 2/2004 | Sunkara et al. |
| 2004/0225161 A1 | 11/2004 | Sunkara et al. |
| 2004/0260125 A1 | 12/2004 | Seapan et al. |
| 2005/0069997 A1 | 3/2005 | Adkesson et al. |
| 2005/0283028 A1 | 12/2005 | Sunkara et al. |

FOREIGN PATENT DOCUMENTS

| | | |
|---|---|---|
| JP | 2004 182974 A | 7/2004 |
| JP | 2004 352713 A | 12/2004 |
| WO | WO 99/01496 A1 | 1/1999 |
| WO | WO 2004/048440 A1 | 6/2004 |
| WO | WO 2004/099110 A1 | 11/2004 |

*Primary Examiner*—Samuel A. Acquah
(74) *Attorney, Agent, or Firm*—Mark D. Kuller; Bart E. Lerman

(57) ABSTRACT

A process of manufacture of polytrimethylene ether glycol comprising:
(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;
(b) adding water to the polytrimethylene ether glycol to form an aqueous mixture;
(c) heating the aqueous mixture to hydrolyze acid esters formed during the acid catalyzed polycondensation;
(d) adding to the hydrolyzed aqueous mixture organic solvent that is miscible with polytrimethylene ether glycol to form (i) organic phase containing the polytrimethylene ether glycol and residual acid polycondensation catalyst from the polycondensing and (ii) aqueous phase;
(e) separating the aqueous phase and the organic phase;
(f) adding base to the separated organic phase to neutralize the residual acid polycondensation catalyst by forming salts of the residual acid polycondensation catalyst;
(g) separating the organic phase into (i) liquid phase comprising the polytrimethylene ether glycol, the organic solvent and any residual water, and (ii) solid phase comprising the salts of the residual acid polycondensation catalyst and the base which is unreacted; and
(h) removing the organic solvent and the residual water from the liquid phase to obtain polytrimethylene ether glycol.

18 Claims, No Drawings

MANUFACTURE OF POLYTRIMETHYLENE ETHER GLYCOL

FIELD OF THE INVENTION

The present invention relates to an improved process for purifying polytrimethylene ether glycol.

BACKGROUND OF THE INVENTION

Polytrimethylene ether glycol and its uses have been described in the art. Preferred methods for preparation of polytrimethylene ether glycol involve acid catalyzed polycondensation of 1,3-propanediol. For example, U.S. Pat. No. 6,720,459, which is incorporated herein by reference, discloses a continuous process for preparation of polytrimethylene ether glycol from 1,3-propanediol using a polycondensation catalyst, preferably an acid catalyst.

WO99/01496, which is incorporated herein by reference, discloses a process for the purification of polyethers includes the steps of (a) heating a polyether glycol with water for a time and at temperature sufficient to substantially hydryrolyze esters formed during polymerization, (b) separating the polyether from the water, and (c) subjecting the polyether recovered from step (b) to further washing with hot water to remove residual acid.

US 2002-0007043 A1, which is incorporated herein by reference, describes a purification procedure for crude polytrimethylene ether glycol obtained from an acid catalyzed polymerization process comprising (1) a hydrolysis step to hydrolyze the acid esters formed during the acid catalyzed polymerization, (2) phase separation and water extraction steps to remove the soluble acid catalyst, generating an organic phase and a waste aqueous phase, (3) a base treatment of the organic phase to neutralize and precipitate the residual acid present, and (4) drying and filtration of the polymer to remove residual water and solids. It is clear from US 2002-0007043 A1 that when sulfuric acid is used as a catalyst to make polyether glycols from their corresponding diols, it is preferred to include a hydrolysis step because a substantial portion of the acid is converted to the ester, alkyl hydrogen sulfate. These ester groups act as emulsifying agents during the water washing process, thus causing the washing process to be difficult and time consuming, and causing incomplete acid removal. The hydrolysis step is also important in order to obtain polymer with the high dihydroxy functionality required to use the polymer as a reactive intermediate. When the hydrolysis step is incorporated into the process, it is generally found that the phase separation between the water and polytrimethylene ether glycol phases can take a substantial amount of time, e.g. up to about 35–40 hours. Consequently, there is a need for a method to reduce the phase separation time.

JP2004-182974A, which is incorporated herein by reference, discloses a polycondensation process for preparing polyether polyols, including preparing polytrimethylene ether glycol from 1,3-propanediol, utilizing a polycondensation catalyst system that contains both an acid and a base. It is disclosed that the use of this catalyst system produces polyether polyol with high degree of polymerization and low color under mild conditions. The purification process utilizes a hydrolysis step wherein water and organic solvent that has affinity for both water and the polyether polyol are used and subsequent separation into aqueous and organic phases. In one example this patent application discloses use of calcium hydroxide to treat the organic phase after the phase separation. This process has a disadvantage in that organic solvent ends up in both the aqueous and polymer (polyether polyol) phases. It is undesirable to have a solvent present in the aqueous phase because the disclosed organic solvents are flammable and, thus, it is necessary to recover the organic solvent from the aqueous phase prior to reuse or disposal of the water and in order to reuse the organic solvent. In addition, the presence of solvent in the aqueous phase may dissolve more polymer or oligomers and therefore the polymer yields will be lower. Consequently, a process that does not result in solvent and polyether polyol in the aqueous phase is desired. This process also has the disadvantage that the resulting polyether polyols contain base catalyst residues.

SUMMARY OF THE INVENTION

This invention is directed to a process of manufacture of polytrimethylene ether glycol comprising:

(a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;

(b) adding water to the polytrimethylene ether glycol to form an aqueous mixture;

(c) heating the aqueous mixture to hydrolyze acid esters formed during the acid catalyzed polycondensation;

(d) adding to the hydrolyzed aqueous mixture organic solvent that is miscible with polytrimethylene ether glycol to form (i) organic phase containing the polytrimethylene ether glycol and residual acid polycondensation catalyst from the polycondensing and (ii) aqueous phase;

(e) separating the aqueous phase and the organic phase;

(f) adding base to the separated organic phase to neutralize the residual acid polycondensation catalyst by forming salts of the residual acid polycondensation catalyst;

(g) separating the organic phase into (i) liquid phase comprising the polytrimethylene ether glycol, the organic solvent and any residual water, and (ii) solid phase comprising the salts of the residual acid polycondensation catalyst and the base which is unreacted; and (h) removing the organic solvent and the residual water from the liquid phase to obtain polytrimethylene ether glycol.

In step (d) it is preferred that the organic and aqueous phases be distinctly separate, so that there are two layers that can be seen to be distinct.

Preferably the reactant comprises 90% or more by weight of 1,3-propanediol, 1,3-propanediol dimer and 1,3-propanediol trimer. More preferably the reactant comprises 90% or more by weight of 1,3-propanediol.

Preferably the acid polycondensation catalyst is selected from the group consisting of Bronsted acids, Lewis acids and super acids. More preferably the acid polycondensation catalyst is selected from the group consisting of sulfuric acid, hydriodic acid, fluorosulfonic acid, p-toluenesulfonic acid, benzenesulfonic acid, methanesulfonic acid, trifluoromethanesulfonic acid, 1,1,2,2-tetrafluoroethanesulfonic acid, and 1,1,1,2,3,3-hexafluoropropanesulfonic acid. Most preferably the polycondensation catalyst is sulfuric acid.

Preferably the polycondensation catalyst is used in an amount of from about 0.1 wt. % to about 3 wt. % based on the weight of the reactant. More preferably the polycondensation catalyst is used in an amount of from about 0.5 wt. % to about 1.5 wt. % based on the weight of reactants.

Preferably the organic solvent is a water-immiscible solvent. Preferably the solvent is selected from the group consisting of toluene, ethyl acetate, butyl acetate, n-hexane, cyclohexane and mixtures thereof, most preferably toluene.

Preferably the amount of organic solvent used may vary from about 10 to about 100 wt. %, more preferably from about 15 to about 50 wt. %, and more preferably up to about 30 wt %, based on the weight of the polytrimethylene ether glycol.

Preferably in step (e) the reaction mixture is allowed to stand, preferably without agitation, and preferably at a temperature about 5 to about 20° C. below the boiling temperature of the organic solvent, for a time sufficient for the organic and water phases to separate.

Preferably the base is selected from the group consisting of alkaline earth metal hydroxides, alkaline earth metal oxides and alkaline earth metal carbonates. More preferably the base is selected from the group consisting of calcium hydroxide, calcium oxide, calcium carbonate, magnesium hydroxide, magnesium oxide, magnesium carbonate, barium carbonate, barium oxide, barium hydroxide and mixtures thereof. Most preferably the base comprises calcium hydroxide.

In a preferred embodiment, the process of manufacture of polytrimethylene ether glycol comprises:

(a) polycondensing reactant comprising 90% or more by weight diol selected from the group consisting of 1,3-propanediol, 1,3-propanediol dimer and 1,3-propanediol trimer or mixtures thereof in the presence of about 0.1 wt. % to about 3 wt. % based on the weight of the reactant of acid polycondensation catalyst at a temperature of about 150° C. to about 210° C. to form polytrimethylene ether glycol having a number average molecular weight of from about 250 to about 5,000;

(b) adding 10 to 200 weight %, by weight of the polytrimethylene ether glycol, water to the polytrimethylene ether glycol to form an aqueous mixture;

(c) heating the aqueous mixture from about 80 to about 110° C. at a pressure of from about 700 mm Hg to about 1600 mm Hg, preferably for 0.5 to 5 hours, to hydrolyze acid esters formed during the acid catalyzed polycondensation;

(d) adding to the hydrolyzed aqueous mixture about 10 wt. % to about 100 wt. %, based on the weight of the polytrimethylene ether glycol, water-immiscible organic solvent that is miscible with polytrimethylene ether glycol selected from the group consisting of toluene, ethylacetate, butyl acetate, n-hexane, cyclohexane or mixtures thereof, at 5 to 20° C. below the boiling point of the solvent to form (i) organic phase containing the polytrimethylene ether glycol and residual acid polycondensation catalyst from the polycondensing and (ii) aqueous phase;

(e) allowing the reaction mixture to stand at a temperature about 5 to 20° C. below the boiling temperature of the organic solvent for a time sufficient for the organic and water phases to separate;

(f) separating the aqueous phase and the organic phase by decantation or draining;

(g) adding base selected from the group consisting of alkaline earth metal hydroxides, alkaline earth metal oxides and alkaline earth metal carbonates to the separated organic phase to neutralize the residual acid polycondensation catalyst by forming salts of the residual acid polycondensation catalyst, preferably at a temperature of about 50 to about 90° C.;

(h) separating by filtering, centrifuging or combinations thereof the organic phase into (i) liquid phase comprising the polytrimethylene ether glycol, the organic solvent and any residual water, and (ii) solid phase comprising the salts of the residual acid polycondensation catalyst and the base which is unreacted; and (i) removing the organic solvent and the residual water from the liquid phase by vacuum stripping to obtain polytrimethylene ether glycol.

Preferably the base is selected from the group consisting of alkaline earth metal hydroxides, alkaline earth metal oxides and alkaline earth metal carbonates. More preferably it is selected from the group consisting of the group consisting of calcium hydroxide, calcium oxide, calcium carbonate, magnesium hydroxide, magnesium oxide, magnesium carbonate, barium carbonate, barium oxide and barium hydroxide, Most preferably, the base comprises calcium hydroxide. The water-immiscible solvent is selected from the group consisting of toluene, ethyl acetate, butyl acetate, n-hexane and cyclohexane.

DETAILED DESCRIPTION OF THE INVENTION

All publications, patent applications, patents, and other references mentioned herein are incorporated by reference in their entirety. Unless otherwise defined, all technical and scientific terms used herein have the same meaning as commonly understood by one of ordinary skill in the art to which this invention belongs. In case of conflict, the present specification, including definitions, will control.

Although methods and materials similar or equivalent to those described herein can be used in the practice or testing of the present invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" are employed to describe elements and components of the invention. This is done merely for convenience and to give a general sense of the invention.

This description should be read to include one or at least one and the singular also includes the plural unless it is obvious that it is meant otherwise.

The materials, methods, and examples herein are illustrative only and, except as specifically stated, are not intended to be limiting.

In the context of this disclosure the term "miscible" as applied to mixtures of two or more materials is intended to mean that upon mixing the materials a single phase is formed. The term "immiscible" is intended to mean that upon mixing the materials two or more phases are formed. An organic solvent is considered to be miscible with the organic phase if the polytrimethylene ether glycol and organic solvent can be mixed to form a single organic phase.

This invention is a method for manufacture of polytrimethylene glycol using an acid polycondensation catalyst. The method includes a novel and improved process for purification of the polytrimethylene ether glycol.

The starting material for the process is reactant comprising at least one of 1,3-propanediol, 1,3-propanediol dimer and 1,3-propanediol trimer, or mixtures thereof. The 1,3-propanediol reactant employed in the process of the present invention may be obtained by any of the various chemical routes or by biochemical transformation routes. Preferred routes are described in U.S. Pat. Nos. 5,015,789, 5,276,201, 5,284,979, 5,334,778, 5,364,984, 5,364,987, 5,633,362, 5,686,276, 5,821,092, 5,962,745, 6,140,543, 6,232,511, 6,235,948, 6,277,289, 6,284,930, 6,297,408, 6,331,264 and 6,342,646, and US 2004-0225161 A1, US 2004-0260125 A1 and US 2005-0069997 A1, all of which are incorporated herein by reference in their entireties. Preferably the 1,3-propanediol used as the reactant or as a component of the reactant will have a purity of greater than about 99% by weight as determined by gas chromatographic analysis.

Although any of 1,3-propanediol, and dimers or trimers of 1,3-propanediol can be used as the reactant in the process of the invention, it is preferred that the reactant comprise about 90% or more by weight of 1,3-propanediol. More preferably the reactant will comprise 99% or more by weight of 1,3-propanediol.

The starting material for the present invention may also contain small amounts, preferably no more than about 30%, more preferably no more than about 10%, by weight, of the starting material, of comonomer diols in addition to the reactant 1,3-propanediol or its dimers and trimers without detracting from the efficacy of the process. Examples of preferred comonomer diols include ethylene glycol, 2-methyl-1,3-propanediol, 2,2-dimethyl-1,3 propane diol and $C_6$-$C_{12}$ diols such as 2,2-diethyl-1,3-propanediol, 2-ethyl-2-hydroxymethyl-1,3-propanediol, 1,6-hexanediol, 1,8-octanediol, 1,10-decanediol, 1,12-dodecanediol, 1,4-cyclohexanediol, and 1,4-cyclohexanedimethanol. A more preferred comonomer diol is ethylene glycol. Polytrimethylene ether glycols prepared from 1,3-propanediol and ethylene glycol are described in U.S. Patent Application Publication No. 2004/0030095, which is incorporated herein by reference.

The polytrimethylene ether glycols of this invention can also be prepared using about 10 to about 0.1 mole percent of aliphatic or aromatic diacid or diester, preferably terephthalic acid or dimethyl terephthalate, and most preferably terephthalic acid, as described in detail in U.S. Pat. No. 6,608,168, which is incorporated herein by reference.

Stabilizers (e.g., UV stabilizers, thermal stabilizers, antioxidants, corrosion inhibitors, etc.), viscosity boosters, antimicrobial additives, and coloring materials (e.g., dyes, pigments, etc.) may be added to the polymerization mixture or final product if necessary.

Any acid catalyst suitable for acid catalyzed polycondensation of 1,3-propanediol may be used in present process. Preferred acid polycondensation catalysts are described in U.S. Published Patent Application No. 2002/0007043 A1 and in U.S. Pat. No. 6,720,459, both of which are incorporated herein by reference. They are preferably selected from the group consisting of Lewis acids, Bronsted acids, super acids, and mixtures thereof, and they include both homogeneous and heterogeneous catalysts. More preferably the catalysts are selected from the group consisting of inorganic acids, organic sulfonic acids, heteropolyacids and metal salts. Most preferably the catalyst is a homogeneous catalyst, preferably selected from the group consisting of sulfuric acid, hydriodic acid, fluorosulfonic acid, phosphorous acid, p-toluenesulfonic acid, benzenesulfonic acid, methanesulfonic acid, phosphotungstic acid, trifluoromethanesulfonic acid, phosphomolybdic acid, 1,1,2,2-tetrafluoroethanesulfonic acid, 1,1,1,2,3,3-hexafluoropropanesulfonic acid, bismuth triflate, yttrium triflate, ytterbium triflate, neodymium triflate, lanthanum triflate, scandium triflate, and zirconium triflate. The catalyst can also be a heterogeneous catalyst, preferably selected from the group consisting of zeolites, fluorinated alumina, acid-treated alumina, heteropolyacids and heteropolyacids supported on zirconia, titania alumina and/or silica. The most preferred catalyst is sulfuric acid.

Preferably the polycondensation catalyst is used in an amount of from about 0.1 wt. % to about 3 wt. %, more preferably from about 0.5 wt. % to about 1.5 wt. %, based on the weight of the reactant.

A polycondensation catalyst that contains both an acid and a base, such as described in JP2004-182974A (which is incorporated herein by reference) can be used. JP2004-182974A discloses a polycondensation process for preparing polyether polyols, including preparing polytrimethylene ether glycol from 1,3-propanediol, utilizing a polycondensation catalyst that contains both an acid and a base. Examples of bases useful in this acid and base catalyst system include, but are not limited to, nitrogen containing organic bases such as pyridine, n-methyl imidazole, 3-picoline, 1,8-diazabicyclo7-undecene, and alkali metal salts such as sodium carbonate. Preferably the process of this invention will be carried out without use of such a base.

The polymerization process can be batch, semi-continuous, continuous, etc. A preferred batch process is described in US 2002/0007043 A1, which is incorporated herein by reference. In this embodiment the polytrimethylene-ether glycol is prepared by a process comprising the steps of: (a) providing (1) reactant, and (2) acid polycondensation catalyst; and (b) polycondensing the reactants to form a polytrimethylene ether glycol. The reaction is conducted at an elevated temperature of at least about 150° C., more preferably at least about 160° C., up to about 210° C., more preferably about 200° C. The reaction is preferably conducted either at atmospheric pressure in the presence of inert gas or at reduced pressure (i.e., less than 1 atmosphere), preferably less than about 500 mm Hg in an inert atmosphere and extremely low pressures can be used (e.g., as low as about 1 mm Hg).

A preferred continuous process for preparation of the polytrimethylene ether glycols of the present invention is described in U.S. Pat. No. 6,720,459, which is incorporated herein by reference. Thus, in this embodiment the polytrimethylene ether glycol is prepared by a continuous process comprising: (a) continuously providing (i) reactant, and (ii) polycondensation catalyst; and (b) continuously polycondensing the reactant to form polytrimethylene ether glycol Regardless of whether the process is a continuous or batch process, when a homogeneous acid catalyst, particularly sulfuric acid, is used, a substantial amount of acid ester is formed from the catalyst. In the case of sulfuric acid, a substantial portion of the acid is converted to the ester, alkyl hydrogen sulfate. It is important to remove these acid esters because they act as emulsifying agents during the water washing used to remove catalyst and therefore cause the washing process to be difficult and time consuming. Moreover, the hydrolysis step is also important in order to obtain polymer with the high dihydroxy functionality required to use the polymer as a reactive intermediate.

The hydrolysis step is preferably carried out by adding water to the polymer and heating at a temperature range from about 80 to about 110° C., preferably at about 90 to about 110° C. (preferably about 90 to about 100° C. when carried out at atmospheric pressure), for a period of sufficient time (in the absence of agitation), and subsequently allowing the water phase and the polymer phase to separate and settle so that the water phase can be removed. Prior to this invention it was found that this period of phase separation and settling was protracted. For example, with prior processes it was not unusual for the settling to take as long as 36 hours before the phases separated sufficiently. Using the invention the period for phase separation after hydrolysis is shortened and in batch process is preferably less than one hour. Preferably this time period is 5 minutes to one hour, most preferably 30 minutes or less. Preferably the amount of water added may vary from about 10 to about 200 wt. %, more preferably from about 50 to about 100 wt. %, based on the weight of the polytrimethylene ether glycol. The hydrolysis step is conducted preferably at atmospheric or slightly above atmospheric pressure, preferably at (about 700 mmHg to about 1600 mmHg. Higher pressures can be used, but are not preferred. The settling step is carried out preferably under inert gas atmosphere.

Following the hydrolysis and phase separation steps in the conventional processes, it is usual to add a base, generally an insoluble base, to neutralize any remaining acid in the polytrimethylene ether glycol. Following the neutralization step, the polymer is dried under reduced pressure to remove residual water. The unreacted base and the neutralization products present in the polymer are removed by filtration or centrifugation, preferably filtration with the help of a filter-aid. The preferred filtration step also can be very time consuming. For example, it has been found that filtration can take as long as 9 hours.

The present invention provides a novel way of reducing the time required for both the phase separation/settling and the filtration steps. Surprisingly, it has been found that addition of organic solvent that is miscible with polytrimethylene ether glycol following the hydrolysis step substantially reduces both the phase separation/settling time and the filtration time. For example, addition of such a solvent in a process that required 12 hours for phase separation and settling reduced that time to only about 30 minutes. Filtration time, after neutralization, was reduced from 7 hours to about 30 minutes.

The organic solvent for use in the process should be immiscible with water. Mixtures of water-immiscible solvents may be used as well. Preferable water immiscible solvents are aliphatic or aromatic hydrocarbons, more preferably with a high enough volatility to be easily removed under vacuum. Examples of such water-immiscible solvents are toluene, ethyl acetate, n-hexane, cyclohexane and mixtures thereof. Preferred water-immiscible solvents are toluene, ethyl acetate, butyl acetate, cyclohexane, and mixtures thereof. The most preferred water-immiscible solvent is toluene.

Preferably the amount of organic solvent used may vary from about 10 to about 100 wt. %, more preferably from about 15 to about 50 wt. %, and more preferably up to about 30 wt %, based on the weight of the polytrimethylene ether glycol. It is preferable to carry out this step at a temperature at least about 5 to 20° C. below boiling temperature of the solvent before addition of the solvent. (When mixtures of solvents are used, the boiling point of the lowest boiling solvent should be used to determine this temperature.)

Following hydrolysis, cooling and solvent addition the reaction mixture is allowed to stand, preferably without agitation and at a temperature at least about 5° C., and preferably up to 20° C., below the boiling temperature of the organic solvent, until phase separation has occurred. As indicated above, the time required for the separation will be substantially less than that required for a process that is the same except for the omission of the organic solvent.

The next step is separating the aqueous phase and the organic phase, preferably by decantation or draining. It is advantageous to retain the organic phase in the reactor for subsequent processing. Consequently, when the organic phase is on bottom it is preferably to decant off the aqueous phase and when the organic phase is on top, it is preferred to drain off the aqueous phase.

After the aqueous phase is removed, base is added to the retained organic phase for neutralization. Preferably, the base is selected from the group consisting of alkaline earth metal hydroxides, alkaline earth metal oxides and alkaline earth metal carbonates or mixtures thereof. More preferably, the base is selected from the group consisting of calcium hydroxide, calcium oxide, calcium carbonate, magnesium hydroxide, magnesium oxide, magnesium carbonate, barium carbonate, barium oxide and barium hydroxide or mixtures thereof. Most preferably the base is calcium hydroxide. The base may be added as a dry solid, or preferably as an aqueous slurry. The amount of insoluble base utilized in the neutralization step is preferably at least enough to neutralize all of the acid polycondensation catalyst. More preferably a stoichiometric excess of from about 0.1 wt. % to about 10 wt. % is utilized. The neutralization is preferably carried out at about 50 to about 90° C. for a period of from 0.1 to 3 hours under nitrogen or argon atmosphere.

Following the neutralization the organic phase containing the polytrimethylene ether glycol is separated, preferably by filtration (preferably with use of filter-aid material) (see, e.g., U.S. patent application Ser. No. 10/871,622, filed Jun. 18, 2004, which is incorporated herein by reference), or centrifugation, to remove the base and the acid/base reaction products by centrifugation or filtration methods well known in the art. For example, filtration under the earth's gravity, centrifugal filtration, or pressure filtration can be used. Filter presses, candle filters, pressure leaf filters or conventional filter papers are also be used for the filtration, which can be carried out batchwise or continuously. Filtration in the presence of a filter-aid is preferred at a temperature range from 50 to 100° C. at a pressure range from 700 to 1600 mm Hg. As discussed above, the time required for the filtration will be substantially less than that required for a process that is the same except for the omission of the organic solvent.

After separation, the solvent and any residual water is removed from the organic phase. Preferably this is accomplished by vacuum stripping (e.g., distillation at low pressure), generally with heating, to remove organic solvent, any remaining water, and if desired, unreacted monomeric materials. Other techniques can be used, such as distillation at about atmospheric pressure. The remaining polytrimethylene ether glycol will preferably have a number average molecular weight of from about 250 to about 5,000. Mn of 1,000 to 3,000 is preferred for many applications. The advantages of this novel process in terms of reduction of phase separation time and filtration time have already been discussed. However, there are additional advantages, which although more difficult to quantify, are highly significant. First, previous processes usually require more than one water wash because of the difficulty of phase separation. The processes of the invention, however, usually require only one water wash and consequently minimize the amount of waste water produced. Moreover, the reduced number of water washes minimizes the amount of low molecular weight oligomers lost because of water solubility.

Second, the process of the invention eliminates the need for high pressure or reduced pressure during filtration, thus providing an energy saving.

The invention is illustrated in the following examples. All parts, percentages, etc., referred to in the examples are by weight unless otherwise indicated.

EXAMPLES

The 1,3-propanediol utilized in the examples was prepared by biological methods described in U.S. patent application Ser. No. 10/839,188, filed May 5, 2004, which is incorporated herein by reference and had a purity of >99.8%

Comparative Example

This example describes preparation of polytrimethylene ether glycol (Mn of about 2000) without the use of added solvent for comparison with the examples which follow that utilize solvent according to the invention.

1,3-Propanediol (11.9 kg) and 108 g of sulfuric acid were charged into a 22 L glass flask and then heated at 166+/−1° C. under nitrogen for 24 hours to produce polytrimethylene ether glycol. During the reaction, by-product water was removed by nitrogen sparging.

After the 24-hour heating period, 8 kg of de-ionized water was added and the resulting aqueous mixture was held at 95° C. for 4 hours under nitrogen to hydrolyze the acid ester formed during the acid catalyzed polycondensation.

After hydrolysis, the reaction mixture was cooled to 60° C. and allowed to stand for phase separation. About 12 hours were required for separation into two phases, the bottom layer being the organic phase and the top layer the aqueous phase.

The organic phase was transferred into a rotary-evaporator. The material of the organic phase was analyzed by titration to determine the amount of base necessary for neutralization of the residual acid, and 0.5 g of calcium hydroxide was added. The resulting mixture was stirred at 70° C. for 1 hour.

After neutralization, the temperature was increased to 90° C. and held for 3 hours at 10 mm of Hg to remove residual water. After drying, the mixture was filtered under 15 psig nitrogen to obtain the purified polytrimethylene ether. Filtration time was about 7 hours.

Example 1

This example describes purification of polytrimethylene ether glycol utilizing toluene as added water-immiscible solvent 1,3-Propanediol (11.9 kg) and 108 g of sulfuric acid were charged into a 22 L glass flask and then heated at 166+/−1° C. under nitrogen for 24 hours to produce polytrimethylene ether glycol. During the reaction, by-product water was removed by nitrogen sparging.

After the polymerization step, 4 kg of de-ionized water was added and the resulting mixture was held at 95° C. for 4 hours under nitrogen to hydrolyze the acid ester formed during the acid catalyzed polycondensation.

After hydrolysis, 2.6 kg of toluene was added, followed by stirring for 10 minutes at 95° C. Then the agitation was stopped. About 20–30 minutes were required for the mixture to separate into two phases, the organic phase at the top and the aqueous phase at the bottom.

Based on titration of a sample of the top layer, 4.0 g of calcium hydroxide was added to the organic phase to neutralize the residual acid catalyst, followed by stirring at 70° C. for 1 hour.

After neutralization, the mixture was filtered at 15 psig under nitrogen to remove solids, and then it was heated at 90° C. for 3 hour at 10 mmHg in a rotary-evaporator, and to remove the residual water and toluene, and obtain purified polytrimethylene ether glycol.

Comparative Example 2

This example describes preparation of polytrimethylene ether glycol (Mn of about 800) without the use of added solvent for comparison with example 5 which follow that do utilize solvent according to the invention.

1,3-Propanediol (11.9 kg) and 108 g of sulfuric acid were charged into a 22 L glass flask and then heated at 166+/−1° C. under nitrogen for 12 hours to produce polytrimethylene ether glycol. During the reaction, by-product water was removed by nitrogen sparging.

After the 12-hour heating period, 8 kg of de-ionized water was added and the resulting aqueous mixture was held at 95° C. for 4 hours under nitrogen to hydrolyze the acid ester formed during the acid catalyzed polycondensation.

After hydrolysis, the reaction mixture was cooled to 60° C. and allowed to stand for phase separation. About 6 hours were required for separation into two phases, the bottom layer being the organic phase and the top layer the aqueous phase.

The organic phase was transferred into a rotary-evaporator. The material of the organic phase was analyzed by titration to determine the amount of base necessary for neutralization of the residual acid, and 0.5 g of calcium hydroxide was added. The resulting mixture was stirred at 70° C. for 1 hour.

After neutralization, the temperature was increased to 90° C. and held for 3 hours at 10 mm of Hg to remove residual water. After drying, the mixture was filtered under 15 psig nitrogen to obtain the purified polytrimethylene ether. Filtration time was about 3 hours.

Example 2

This example describes preparation of polytrimethylene ether glycol utilizing toluene as added water-immiscible solvent Polymerization of 1,3-propanediol was carried out as described above for Comparative Example 2. After the polymerization step, 4 kg of de-ionized water was added and keep the resulting mixture was held at 95° C. for 4 hours under nitrogen to hydrolyze the acid ester formed during the acid catalyzed polycondensation.

After hydrolysis, 2.6 kg of toluene was added followed by stirring for 10 minutes at 95° C. Then the agitation was stopped. About 20–30 minutes were required for the mixture to separate into two phases, the organic phase at the top and the aqueous on the bottom.

Based on titration of a sample of the top layer, 5.0 g of calcium hydroxide was added to the organic phase to neutralize the residual acid catalyst, followed by stirring at 70° C. for 1 hour.

After neutralization, the mixture was filtered at 15 psig nitrogen to remove solids, and then it was heated at 90° C. for 3 hour at 10 mmHg in a rotary-evaporator, and to remove the residual water and toluene, and obtain purified polytrimethylene ether glycol.

Comparative Example 3

This example describes preparation of polytrimethylene ether glycol (Mn of about 2400) without the use of added solvent. It is presented for comparison with the following example, which utilizes solvent according to the invention.

1,3-Propanediol (11.9 kg) and 108 g of sulfuric acid were charged into a 22 L glass flask and then heated at 166+/−1° C. under nitrogen for 33 hours to produce polytrimethylene ether glycol. During the reaction, by-product water was removed by nitrogen sparging.

After the 33-hour heating period, 8 kg of de-ionized water was added and the resulting aqueous mixture was held at 95° C. for 4 hours under nitrogen to hydrolyze the acid ester formed during the acid catalyzed polycondensation.

After hydrolysis, the reaction mixture was cooled to 60° C. and allowed to stand for phase separation. About 35 hours were required for separation into two phases, the bottom layer being the organic phase and the top layer the aqueous phase.

The organic phase was transferred into a rotary-evaporator. The material of the organic phase was analyzed by titration to determine the amount of base necessary for neutralization of the residual acid, and 0.5 g of calcium hydroxide was added. The resulting mixture was stirred at 70° C. for 1 hour.

After neutralization, the temperature was increased to 90° C. and held for 3 hours at 10 mm of Hg to remove residual water. After drying, the mixture was filtered under 15 psig nitrogen to obtain the purified polytrimethylene ether. Filtration time was about 9 hours.

Example 3

This example describes preparation of polytrimethylene ether glycol utilizing toluene as added water-immiscible solvent Polymerization of 1,3-propanediol was carried out as described above for Comparative Example 3. After the polymerization step, 4 kg of de-ionized water was added and keep the resulting mixture was held at 95° C. for 4 hours under nitrogen to hydrolyze the acid ester formed during the acid catalyzed polycondensation.

After hydrolysis, 3.5 kg of toluene was added followed by stirring for 10 minutes at 95° C. Then the agitation was stopped. About 30 minutes were required for the mixture to separate into two phases, the organic phase at the top and the aqueous on the bottom.

Based on titration of a sample of the top layer, 3.14 g of calcium hydroxide was added to the organic phase to neutralize the residual acid catalyst, followed by stirring at 70° C. for 1 hour.

After neutralization, the mixture was filtered at 15 psig nitrogen to remove solids, and then it was heated at 90° C. for 3 hour at 10 mmHg in a rotary-evaporator, and to remove the residual water, and toluene and obtain purified polytrimethylene ether glycol.

The results of the Comparative Examples and Examples 1–3 are summarized in Table 1 below.

TABLE 1

| | Solvent | Phase Separation time, hr | Filtration time, hr | $M_n$ | Overall Yield, % |
|---|---|---|---|---|---|
| Comp. Ex. 1 | None | 12 | 7 | 2000 | 72 |
| Example 1 | Toluene | 0.5 | 0.5 | 1822 | 83 |
| Comp. Ex. 2 | None | 6 | 3 | 795 | 65 |
| Example 2 | Toluene | 0.5 | 0.5 | 713 | 83 |
| Comp. Ex. 3 | None | 35 | 9 | 2458 | 74 |
| Example 3 | Toluene | 0.5 | 0.5 | 2375 | 82 |

The data in Table 1 shows that the addition of solvent dramatically reduces the phase separation and filtration times while having no substantial effect on the properties of the polytrimethylene ether glycol. Moreover, the present invention also achieved significantly improved yields of the polymer.

What is claimed is:

1. A process of manufacture of poly-trimethylene ether glycol comprising;
   (a) polycondensing reactant comprising diol selected from the group consisting of 1,3-propanediol, 1,3-propanediol dimer and 1,3-propanediol trimer or mixtures thereof in the presence of acid polycondensation catalyst to form polytrimethylene ether glycol;
   (b) adding water to the polytrimethylene ether glycol to form an aqueous mixture;
   (c) heating the aqueous mixture to hydrolyze acid esters formed during the acid catalyzed polycondensation;
   (d) adding to the hydrolyzed aqueous mixture water-immiscible organic solvent that is miscible with poly-trimethyl-ene ether glycol to form (i) organic phase containing the poly-trimethylene ether glycol and residual acid polycondensation catalyst from the polycondensing and (ii) aqueous phase;
   (e) separating the aqueous phase and the organic phase;
   (f) adding base to the separated organic phase to neutralize the residual acid polycondensation catalyst by forming salts of the residual acid polycondensation catalyst;
   (g) separating the organic phase into (i) liquid phase comprising the polytrimethylene ether glycol, the organic solvent and any residual water, and (ii) solid phase comprising the salts of the residual acid polycondensation catalyst and the base which is unreacted; and
   (h) removing the organic solvent and the residual water from the liquid phase to obtain polytrimethylene ether glycol.

2. The process of claim 1 wherein the reactant comprises 90% or more by weight of 1,3-propanediol, 1,3-propanediol dimer and 1,3-propanediol trimer.

3. The process of claim 1 wherein the reactant comprises 90% or more by weight of 1,3-propanediol.

4. The process of claim 1 wherein the water-immiscible solvent is selected from the group consisting of toluene, ethyl acetate, butyl acetate, n-hexane, cyclohexane and mixtures thereof.

5. The process of claim 1 wherein the organic solvent comprises toluene.

6. The process of claim 1 wherein the base is selected from the group consisting of alkaline earth metal hydroxides, alkaline earth metal oxides and alkaline earth metal carbonates.

7. The process of claim 4 wherein the base is selected from the group consisting of alkaline earth metal hydroxides, alkaline earth metal oxides and alkaline earth metal carbonates.

8. The process of claim 1 wherein the base is selected from the group consisting of calcium hydroxide, calcium oxide, calcium carbonate, magnesium hydroxide, magnesium oxide, magnesium carbonate, barium carbonate, barium oxide, barium hydroxide and mixtures thereof.

9. The process of claim 4 wherein the base is selected from the group consisting of calcium hydroxide, calcium oxide, calcium carbonate, magnesium hydroxide, magnesium oxide, magnesium carbonate, barium carbonate, barium oxide, barium hydroxide and mixtures thereof.

10. The process of claim 1 wherein the base comprises calcium hydroxide.

11. The process of claim 1 wherein the amount of organic solvent added is from about 10 wt. % to about 50 wt. % based on the weight of the polytrimethylene ether glycol.

12. The process of claim 4 wherein the amount of organic solvent added is from about 10 wt. % to about 50 wt. % based on the weight of the polytrimethylene ether glycol.

13. The process of claim 1 further comprising between steps (c) and (d), allowing the reaction mixture to stand without agitation at a temperature about 5 to about 20° C. below the boiling temperature of the organic solvent for a time sufficient for the organic and water phases to separate.

14. The process of claim 1 wherein the acid polycondensation catalyst is selected from the group consisting of Bronsted acids, Lewis acids and super acids and is used in an amount of from about 0.1 wt. % to about 3 wt. % based on the weight of the reactants.

15. The process of claim 1 wherein the acid polycondensation catalyst is selected from the group consisting of sulfuric acid, hydriodic acid, fluorosulfonic acid, p-toluenesulfonic acid, benzenesulfonic acid, methanesulfonic acid, trifluoromethanesulfonic acid, 1,1,2,2-tetrafluoroethanesulfonic acid, and 1,1,1,2,3,3-hexafluoropropanesulfonic acid.

16. The process of claim 9 wherein the acid polycondensation catalyst is selected from the group consisting of sulfuric acid, hydriodic acid, fluorosulfonic acid, p-toluenesulfonic acid, benzenesulfonic acid, methanesulfonic acid, trifluoromethanesulfonic acid, 1,1,2,2-tetrafluoroethanesulfonic acid, and 1,1,1,2,3,3-hexafluoropropanesulfonic acid.

17. A process of manufacture of polytrimethylene ether glycol comprising:

(a) polycondensing reactant comprising 90% or more by weight diol selected from the group consisting of 1,3-propanediol, 1,3-propanediol dimer and 1,3-propanediol trimer or mixtures thereof in the presence of about 0.1 wt. % to about 3 wt. % based on the weight of the reactant of acid polycondensation catalyst at a temperature of about 150° C. to about 210° C. to form polytrimethylene ether glycol having a number average molecular weight of from about 250 to about 5,000;

(b) adding 10 to 200 weight %, by weight of the polytrimethylene ether glycol, water to the polytrimethylene ether glycol to form an aqueous mixture;

(c) heating the aqueous mixture to about 80 to about 110° C. at a pressure of from about 700 mm Hg to about 1600 mm Hg to hydrolyze acid esters formed during the acid catalyzed polycondensation;

(d) adding to the hydrolyzed aqueous mixture about 10 wt. % to about 100 wt. %, based on the weight of the polytrimethylene ether glycol, water-immiscible organic solvent that is miscible with polytrimethylene ether glycol selected from the group consisting of toluene, ethylacetate, butyl acetate, n-hexane, cyclohexane or mixtures thereof, at 5 to 20° C. below the boiling point of the solvent to form (i) organic phase containing the polytrimethylene ether glycol and residual acid polycondensation catalyst from the polycondensing and (ii) aqueous phase;

(e) allowing the reaction mixture to stand at a temperature about 5 to 20° C. below the boiling temperature of the organic solvent for a time sufficient for the organic and water phases to separate;

(f) separating the aqueous phase and the organic phase by decantation or draining;

(g) adding base selected from the group consisting of alkaline earth metal hydroxides, alkaline earth metal oxides and alkaline earth metal carbonates to the separated organic phase to neutralize the residual acid polycondensation catalyst by forming salts of the residual acid polycondensation catalyst;

(h) separating by filtering, centrifuging or combinations thereof the organic phase into (i) liquid phase comprising the polytrimethylene ether glycol, the organic solvent and any residual water, and (ii) solid phase comprising the salts of the residual acid polycondensation catalyst and the base which is unreacted; and (i) removing the organic solvent and the residual water from the liquid phase by vacuum stripping to obtain poly-trimethylene ether glycol.

18. The process of claim 17 wherein the base is selected from the group consisting of calcium hydroxide, calcium oxide, calcium carbonate, magnesium hydroxide, magnesium oxide, magnesium carbonate, barium carbonate, barium oxide and barium hydroxide, the water-immiscible solvent is selected from the group consisting of toluene, ethyl acetate, butyl acetate, n-hexane and cyclohexane.

* * * * *